US010069596B1

(12) United States Patent
Chengson et al.

(10) Patent No.: US 10,069,596 B1
(45) Date of Patent: Sep. 4, 2018

(54) SYSTEMS AND METHODS FOR ERROR DETECTION AND CORRECTION

(71) Applicant: Juniper Networks, Inc., Sunnyvale, CA (US)

(72) Inventors: David P. Chengson, Aptos, CA (US); Granthana Kattehalli Rangaswamy, Westford, MA (US); David James Ofelt, Los Gatos, CA (US); Edward C. Priest, Palo Alto, CA (US); Bhavesh Patel, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/388,901

(22) Filed: Dec. 22, 2016

(51) Int. Cl.
*H04L 1/00* (2006.01)
*H04L 1/24* (2006.01)
*H04L 27/06* (2006.01)

(52) U.S. Cl.
CPC .......... *H04L 1/0046* (2013.01); *H04L 1/0045* (2013.01); *H04L 1/242* (2013.01); *H04L 27/06* (2013.01)

(58) Field of Classification Search
CPC ......... H04L 1/0045; H04L 1/004; H04L 1/00; H04L 1/242; H04L 27/06; H04L 1/0046; H04L 1/241; H03K 9/02; H04B 14/023
See application file for complete search history.

(56) References Cited

U.S. PATENT DOCUMENTS

| 5,414,713 A * | 5/1995 | Waschura ............... H04L 43/50 714/715 |
| 9,590,724 B2 * | 3/2017 | Effenberger ......... H04B 10/032 |
| 2014/0258795 A1 * | 9/2014 | Schnizler ............... H04L 1/241 714/705 |

* cited by examiner

Primary Examiner — Betsy Deppe
(74) Attorney, Agent, or Firm — Shumaker & Sieffert, P.A.

(57) ABSTRACT

In an example of this disclosure, a method may include receiving, by a bit error location analyzer, a split information signal at a second data rate derived from an information signal at a first data rate. In this example, the second data rate is less than the first data rate, and the bit error location analyzer may be incapable of performing error analysis at the first data rate The method may include performing error analysis, by the bit error location analyzer, on information represented by the split information signal. In some examples, performing error analysis may include comparing the information represented by the split information signal to an information seed to determine a plurality of bit error locations in the information represented by the split information signal relative to the information seed.

26 Claims, 4 Drawing Sheets

| 200 | Example PRBS-4 Information Seed | 1 | 0 | 1 | 0 | 1 | 0 | 0 | 1 | 1 | 1 | 1 | 1 | 1 | ... | 0 | 1 |
|---|---|---|---|---|---|---|---|---|---|---|---|---|---|---|---|---|---|
| 202 | Example of TRANSMITTED PAM-4 Signal | 2 | | 2 | | 2 | | 1 | | 3 | | 3 | | 3 | ... | | 1 |
| 204 | Example Information Represented By Example of TRANSMITTED PAM-4 Signal Before Being Affected By Noise | 1 | 0 | 1 | 0 | 1 | 0 | 0 | 1 | 1 | 1 | 1 | 1 | 1 | ... | 0 | 1 |
| 206 | Example Bit Significance | MSB | LSB | MSB | LSB | MSB | LSB | MSB | LSB | MSB | LSB | MSB | LSB | MSB | LSB | ... | MSB | LSB |
| 208 | Example Bit Positions In Example Information Represented By Example of TRANSMITTED PAM-4 Signal | 0 | 1 | 2 | 3 | 4 | 5 | 6 | 7 | 8 | 9 | 10 | 11 | 12 | 13 | ... | 253 | 254 |

FIG. 2B

| 210 | Example Of RECEIVED PAM-4 Signal With Errors | 2 | | 3 | | 0 | | 1 | | 3 | | 0 | | 3 | ... | | 1 |
|---|---|---|---|---|---|---|---|---|---|---|---|---|---|---|---|---|---|
| 212 | Example Information Represented By Example of RECEIVED PAM-4 Signal With Errors | 1 | 0 | 1 | 1 | 0 | 0 | 0 | 1 | 1 | 1 | 0 | 0 | 1 | 1 | ... | 0 | 1 |
| 206 | Example Bit Significance | MSB | LSB | MSB | LSB | MSB | LSB | MSB | LSB | MSB | LSB | MSB | LSB | MSB | LSB | ... | MSB | LSB |
| 208 | Example Bit Positions In Example Information Represented By Example of RECEIVED PAM-4 Signal | 0 | 1 | 2 | 3 | 4 | 5 | 6 | 7 | 8 | 9 | 10 | 11 | 12 | 13 | ... | 253 | 254 |

| 214 ⌐ | Example Of First Information Signal Sent By Signal Splitter And Received By A First Bit Error Location Analyzer | 1 | 1 | 0 | 0 | 1 | 0 | 1 | ... | 0 |
|---|---|---|---|---|---|---|---|---|---|---|
| 208 ⌐ | Example Bit Position Relative To Example Information Represented By Example of RECEIVED PAM-4 Signal | 0 | 2 | 4 | 6 | 8 | 10 | 12 | ... | 254 |

FIG. 2C

| 216 ⌐ | Example Of Second Information Signal Sent By Signal Splitter And Received By A First Bit Error Location Analyzer | 0 | 1 | 1 | 1 | 1 | 0 | 1 | ... | 1 |
|---|---|---|---|---|---|---|---|---|---|---|
| 208 ⌐ | Example Bit Position Relative To Example Information Represented By Example of RECEIVED PAM-4 Signal | 1 | 3 | 5 | 7 | 9 | 11 | 13 | ... | 253 |

FIG. 2D

FIG. 3

SYSTEMS AND METHODS FOR ERROR DETECTION AND CORRECTION

TECHNICAL FIELD

This disclosure relates to communication systems and error detection and correction.

BACKGROUND

Information transmitted over a communication channel may encounter noise. The noise may cause fluctuations or differences in the information causing bit errors. Various techniques to reduce the bit errors exist that utilize information of the signal for error correction. Relying upon simulation and modeling to identify the techniques for error correction may be inaccurate.

SUMMARY

In general, this disclosure describes techniques for capturing bit error locations corresponding to bit errors in an information signal. The information signal may be extracted from a carrier signal carrying the information signal. The bit errors and bit error locations may be determined in a system using information signals rather than based on simulations or modeling. In some cases, direct measurement of bit errors in high speed signals may not be practical due to limitations of bit error analyzers, such as frequency limitations of bit error analyzers and inability of bit error analyzers to process different signal types (e.g., inability to process pulse amplitude modulation (PAM)-N signals). This disclosure describes examples of splitting test signals (e.g., information signals in which the information being transmitted is known) into lower data rates for bit error analysis, and combining the analysis into a single error location file allowing for bit error analysis at lower data rates and signal types (e.g., non-return to zero (NRZ)) that bit error rate analyzers are capable of handling. The bit error analysis may then allow for determining an optimal forward error correction encoding scheme based on captured bit error locations for reducing or eliminating errors in subsequent transmissions.

In one example, this disclosure describes a method comprising receiving, by a signal splitter, an information signal at a first data rate; splitting, by the signal splitter, the information signal into at least a first information signal and a second information signal; outputting, by the signal splitter, the first information signal at a second data rate less than the first data rate and the second information signal at a third data rate less than the first data rate; receiving, by a first bit error location analyzer, the first information signal at the second data rate, wherein the first bit error location analyzer is incapable of performing error analysis at the first data rate; performing error analysis, by the first bit error location analyzer, on information represented by the first information signal, wherein performing error analysis includes comparing the information represented by the first information signal to an information seed to determine a first plurality of bit error locations in the information represented by the first information signal relative to the information seed; receiving, by a second bit error location analyzer, the second information signal at the third data rate, wherein the second bit error location analyzer is incapable error analysis at the first data rate; performing error analysis, by the second bit error location analyzer, on information represented by the second information signal, wherein performing error analysis includes comparing the information represented by the second information signal to the information seed to determine a second plurality of bit error locations in the information represented by the second information signal relative to the information seed; and generating, by a bit error location combiner, a single error location file indicating bit error locations based on a combination of the first plurality of bit error locations and the second plurality of bit error locations.

In another example, this disclosure describes a system comprising a signal splitter configured to receive an information signal at a first data rate, split the information signal into at least a first information signal and a second information signal, and output the first information signal at a second data rate less than the first data rate and the second information signal at a third data rate less than the first data rate; a first bit error location analyzer configured to receive the first information signal at the second data rate, and perform error analysis on information represented by the first information signal, wherein the first bit error location analyzer is configured to perform error analysis by being configured to compare the information represented by the first information signal to an information seed to determine a first plurality of bit error locations in the information represented by the first information signal relative to the information seed, and wherein the first bit error location analyzer is incapable of performing error analysis at the first data rate; a second bit error location analyzer configured to receive the second information signal at the third data rate, and perform error analysis on information represented by the second information signal, wherein the second bit error location analyzer is configured to perform error analysis by being configured to compare the information represented by the second information signal to the information seed to determine a second plurality of bit error locations in the information represented by the second information signal relative to the information seed, and wherein the second bit error location analyzer is incapable of performing error analysis at the first data rate; and a bit error location combiner configured to generate a single error location file indicating bit error locations based on a combination of the first plurality of bit error locations and the second plurality of bit error locations.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure describes techniques for capturing bit error locations corresponding to bit errors in an information signal. The information signal may be extracted from a carrier signal carrying the information signal. The bit errors and bit error locations may be determined in a system using information signals rather than based on simulations or modeling. In some cases, direct measurement of bit errors in high speed signals may not be possible due to limitations of bit error analyzers, such as frequency limitations of bit error analyzers and inability of bit error analyzers to process different signal types (e.g., inability to process pulse amplitude modulation (PAM)-N signals) and limits of data size that can be handled/processed with conventional techniques. This disclosure describes examples of splitting test signals (e.g., information signals in which the information being transmitted is known) into lower data rates for bit error analysis, and combining the analysis into a single error location file allowing for bit error analysis at lower data rates and signal types (e.g., non-return to zero (NRZ)) that bit error rate analyzers are capable of handling. The bit error analysis may then allow for determining an optimal forward error correction encoding scheme based on captured bit error locations for reducing or eliminating errors in subsequent transmissions. Accordingly, one possible benefit of the techniques described in this disclosure includes enabling the processing of PAM-N signals for error analysis.

Simulated or modeled signals, noise, errors, and the like are only so good as the underlying modeling assumptions (e.g., linearizing to make the modeling simpler, for instance, or that the noise is assumed to be Gaussian to make the mathematical computation easier/faster in the modeling) which impacts the programming or design behind such simulations or models. Due to limitation of simulated and modeled signals for complex signals such as noise, there may inaccuracies in the modeling or simulation as compared to real signals. For example, real noise on a real communication channel over which a real signal is transmitted may cause different fluctuations on the real signal than compared to what simulated or modeled noise may cause on a simulated signal transmitted over a simulated channel. As another example, a hardware receiver may be configured to perform equalization (e.g., to reduce, remove, or otherwise address intersymbol interference in, for example, a PAM-N signal), which may contribute to errors that are not simulated or modeled (e.g., the equalization of a simulated receiver may not be modeled accurately resulting in any theoretical error occurring in a simulated system being inaccurate relative to actual errors caused by actual equalization in a hardware receiver). In this regard, determinations based on real information are more accurate and better than determinations based on simulated/modeled information and components, such as when it comes to determining an optimal forward correction encoding scheme. Accordingly, one possible benefit of the techniques described in this disclosure includes a more accurate determination of an optimal forward error correction encoding scheme since the determination is based on real information instead of simulated or modeled information.

Another possible benefit of the techniques described in this disclosure includes a reduction in memory consumption. As described in more detail, the techniques described herein may also provide the benefit of enabling a reduction in the amount of memory consumed. For example, the techniques described herein include storing error locations corresponding to information represented by an information signal in non-volatile memory, which avoids storing all of the information represented by the information signal in non-volatile storage. The techniques described herein may include the use of volatile memory (e.g., buffer space memory) for storing the information represented by the information signal as it is received (e.g., as the split information signal is received by an error location analyzer).

As described in more detail, the techniques described herein may also provide the benefit of enabling the determination of an optimal forward error correction encoding scheme. For instance, the forward error correction encoding scheme may be based on bit error locations in real signals, rather than based on simulation, corresponding to binary information represented in an information signal. In some cases, the data rate of the real signal (e.g., the information signal) may be greater than a data rate that a bit error location analyzer is capable of processing. The example techniques describe ways of addressing this problem of bit error analyzers, such as by splitting the real signal into signals having lower data rates, and then combining the error analysis from the split signals. The result may then be used for error correction code determination.

As used herein, an optimal forward error correction encoding scheme may be described as a forward error correction encoding scheme having just the right forward error correction encoding scheme constraints to correct most or all errors in subsequent transmissions. For example, the techniques described herein enable the determination of a block size, a respective T value for each block (where a T value represents the number of correctable symbols), a symbol size, or any combination thereof. In some examples, the block size may be determined to be 1040 bits or a block size different from 1040 bits. In other examples, the block size may not be provided as a selection or recommendation because the block size is understood to be 1040 bits. In some examples, each respective determined T value is a value within a range, such as the range of 2 to 12 inclusive of 2 and 12. In some examples, the determined symbol size may be any number of bits, such as 8 bits, 10 bits, or 12 bits. In some examples, the forward error correction constraints pertain to a Reed-Solomon forward error correction encoding scheme. For example, a block size may be a Reed-Solomon block size, a T value may be a Reed-Solomon T value, and a symbol size may be a Reed-Solomon symbol size.

As used herein, the term "bit error location" refers to a bit position in corresponding binary information that includes a bit error relative to an information seed. In some examples, the bit position number may correspond to a most significant bit numbering scheme (e.g., MSB 0 numbering scheme). In such examples, a 3-bit binary number of 110 has three bit positions: bit position 0, bit position 1, bit position 2; and, according to the MSB 0 numbering scheme, bit position 0 corresponds to the underlined value in $\underline{1}10$, bit position 1, corresponds to the underlined value in $1\underline{1}0$, and bit position 2 corresponds to the underlined value in $11\underline{0}$. In other examples, the bit position number may correspond to a least significant bit numbering scheme (e.g., LSB 0 numbering scheme). In such examples, a 3-bit binary number of 110 has three bit positions: bit position 0, bit position 1, bit position 2; and, according to the LSB 0 numbering scheme, bit position 0 corresponds to the underlined value in $11\underline{0}$, bit position 1, corresponds to the underlined value in $1\underline{1}0$, and bit position 2 corresponds to the underlined value in $\underline{1}10$.

As used herein, the term "information seed" refers to an error-free version of binary information (e.g., a binary sequence of bits, such as a binary sequence of bits including one or more PRBS-M patterns where M is any positive integer). A PRBS-M pattern may include a number of bits equal to $(2^M)-1$. For example, a PRBS-7 pattern may include 127 bits, and two sequential PRBS-7 patterns may equal, in total, 254 bits. The term "information seed" may be described relative to transmission and reception, as described herein. In such an example, a transmitter may be configured to modulate an information signal (e.g., a binary signal) derived from an information seed (e.g., a binary sequence of bits, such as a binary sequence of bits including one or more PRBS-M patterns where M is any positive integer) with a carrier signal (e.g., a PAM-N signal, such as a PAM-4 signal). The transmitter may be configured to transmit the carrier signal carrying the information signal over a communication channel to a receiver. However, noise may cause fluctuation in the carrier signal carrying the information signal during transmission over the communication channel resulting in the information represented by the information signal at the receiver being different from the information represented by the information signal as initially modulated with the carrier signal. The information represented by the information signal as initially modulated with the carrier signal is the information seed in this example. Otherwise described, the information seed is what the information represented by the information signal at the receiver would be if no fluctuations in the carrier signal occurred during transmission over the communication channel. In other examples, the information seed may be more generally described as transmitted information and the information represented by the information signal at the receiver may be more generally described as the received information. Any mismatch between the transmitted information and the received information constitutes an error in the received information.

In some examples, one or more PRBS-M patterns may be included in an information seed from which an information signal is derived for determining error locations for optimizing a forward error correction encoding scheme. The one or more PRBS-M patterns may be well suited as a test because PRBS-M patterns tend to have the same spectral frequency (power spectral density) characteristics as actual data streams. Furthermore, PRBS-M patterns may be useful because splitting an information signal that includes PRBS-M patterns results in a plurality of split information signals including the PRBS-M patterns at a different data rate and phase (e.g., PRBS-M patterns have the property that splitting a PRBS-M pattern into two results in two PRBS-M patterns that include the same bits as the original PRBS-pattern). Any divide by N (where N is a power of 2) of a PRBS bit stream sequence is also the same PRBS sequence at a slower rate and different phase. In an example where a PRBS-31 pattern at 50 Gigabits per second is split into two signals (e.g., bitstreams) of 25 Gigabits per second, a PRBS-31 pattern is present on the LSB bits (e.g., each LSB bit of each transmitted symbol) and another PRBS-31 pattern is present on the MSB bits (e.g., each MSB bit of each transmitted symbol). The LSB PRBS-31 pattern and the MSB PRBS-31 pattern are phase shifted from each other by one half of the pattern period. Based on this phase shift, a bit error location combiner (e.g., bit error location combiner 60 described herein) may be configured to recombine error location data, and may also be configured to deskew any measurement effects such as package, PCB, cable, and/or connector skews. The bit error location combiner 60 described herein may be configured to reconstruct bit error locations relative to information represented by the originally received information signal. As used herein, a symbol represents two or more bits. For example, a PAM-4 signal has four different symbols that represent four different binary sequences (e.g., 00, 01, 10, and 11), and a PAM-31 signal has 31 different symbols that represent thirty-one different binary sequences.

As one simplified example, an information seed may be 0100. The transmitter, in this example, may be configured to modulate an information signal (e.g., a binary signal) derived from the information seed of 0100 with a carrier signal. The transmitter may be configured to transmit the carrier signal carrying the information signal over a communication channel to a receiver. However, noise may cause fluctuation in the carrier signal carrying the information signal during transmission over the communication channel resulting in the information represented by the information signal at the receiver being different from the information represented by the information signal as initially modulated with the carrier signal. For example, the information represented by the information signal at the receiver may be 1110. When the information of 1110 is compared against the information seed of 0100, it is apparent there are two bit error locations relative to the information seed. According to the MSB 0 bit numbering scheme, the two bit error locations in this example include bit position 0 and bit position 2. However, according to the LSB 0 bit numbering scheme, the two bit error locations in this example include bit position 1 and bit position 3. It is thus understood that a "bit error location" may be described as a bit position in information having a bit error relative to an information seed.

Based on the bit error location, a processor or some other device may determine error correction codes. For instance, there may be a relatively large number of ways in which to correct errors, with each providing various advantages and disadvantages (e.g., better error correction but at the cost of processing time). One way to select the proper error correction code(s) is based error characteristics such as locations in the bitstream where errors tend to occur. By determining bit error location, the processor may use this information to determine correction codes that properly balance advantages and disadvantages when applied during actual operation of the system (e.g., real-time data).

Figure 1:
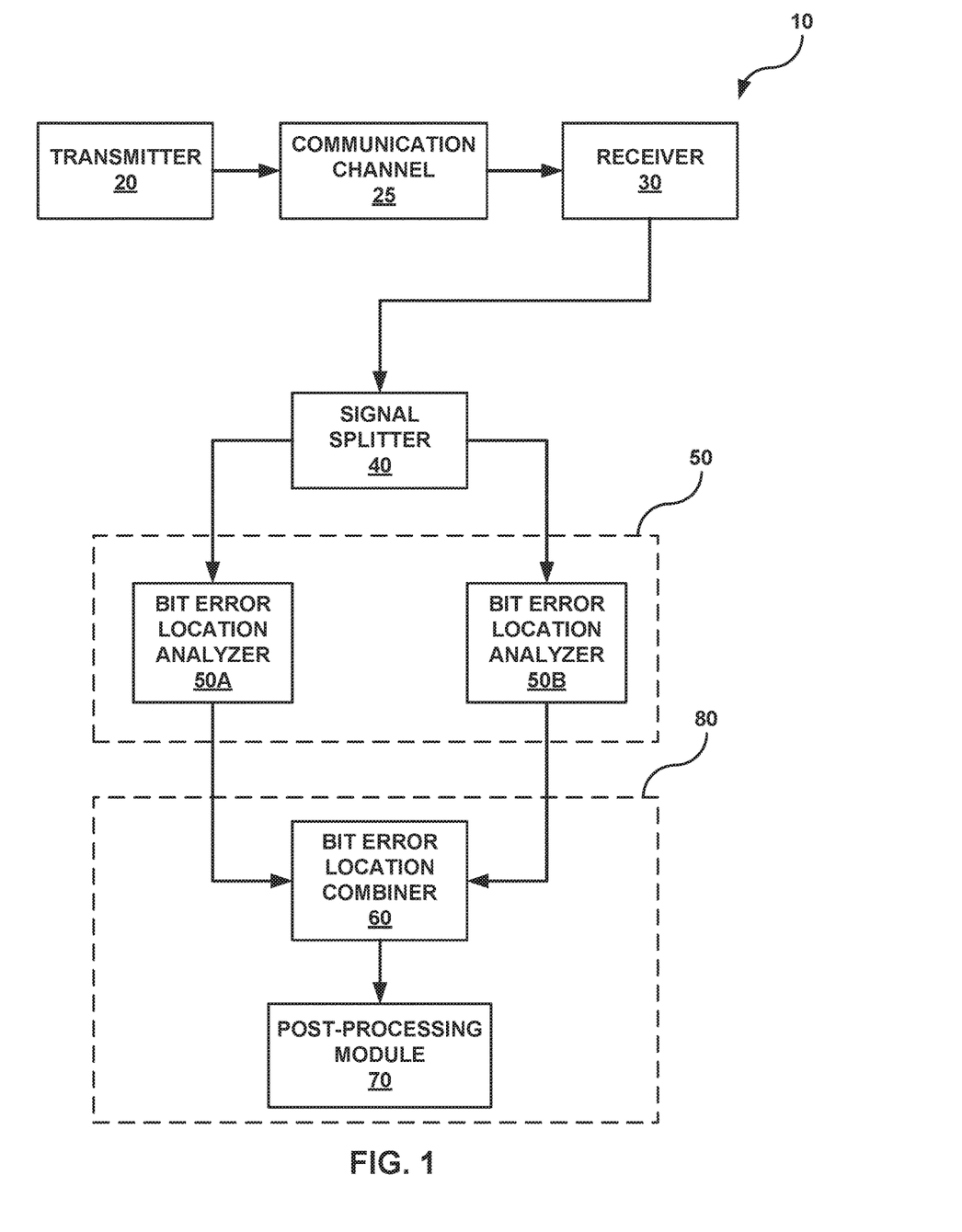
FIG. 1 is a block diagram illustrating an example communication system in accordance with one or more techniques of this disclosure.

FIG. 1 is a block diagram illustrating an example communication system 10 that may utilize one or more techniques of this disclosure. As shown in FIG. 1, the example communication system 10 includes a transmitter 20, a receiver 30, a signal splitter 40, a plurality of bit error location analyzers 50, a bit error location combiner 60, and a post-processing module 70.

In the example of FIG. 1, the plurality of bit error location analyzers 50 is shown as including bit error location analyzer 50A and bit error location analyzer 50B. However, it is understood that the plurality of bit error location analyzers 50 may include two or more bit error location analyzers in other examples. Each bit error location analyzer of the plurality bit error location analyzers may operate in parallel. The number of bit error location analyzers may depend on the number of signals signal splitter 40 is configured to output. For example, communication system 10 may include one bit error location analyzer for each signal output by signal splitter 40. For example, if signal splitter 40 is configured to split one signal into two signals, then communication system 10 may include two bit error location analyzers. As another example, if signal splitter is configured to split one signal into four signals, then communication system 10 may include four bit error location analyzers. As another example, if signal splitter is configured to split one signal into N signals (where N is any positive integer), then communication system 10 may include N bit error location analyzers.

In some examples, the number of bit error location analyzers may be equal to the number of bits in each PAM-N signal. For example, for a PAM-4 signal, the plurality of bit error location analyzers 50 may include two bit error locations analyzers since each symbol (or level) represents two bits. As another example, for a PAM-8 signal, the plurality of bit error location analyzers 50 may include three bit error locations analyzers since each symbol (or level) represents three bits. As another example, for a PAM-16 signal, the plurality of bit error location analyzers 50 may include four bit error locations analyzers since each symbol (or level) represents four bits.

In some examples, transmitter 20, receiver 30, signal splitter 40, and the plurality of bit error location analyzers 50 may each be separate network devices. In others examples, transmitter 20, receiver 30, signal splitter 40, and the plurality of bit error location analyzers 50 may each be separate hardware components of two or more network devices. For example, transmitter 20 may be a hardware component of a first network device, receiver 30 and signal splitter 40 may each be a hardware component of a second network device, and each bit error location analyzer of the plurality of bit error location analyzers 50 may be a hardware component in a separate network device.

In some examples, bit error location combiner 60 may be software executable by one or more processors of a computing device 80. In some examples, computing device 80 may be a network device of communication system 10. In other examples, computing device 80 may be described as any computing device configured to access any memory or memories that the plurality of bit error location analyzers is configured to store error location information thereon. For example, computing device 80 may be a personal computer, such as a desktop computer, laptop computer, tablet computer, or any other personal computing device. Bit error location combiner 60, when software, may be embodied or encoded in a computer-readable medium, such as a computer-readable storage medium, containing instructions. The instructions corresponding to bit error location combiner 60 may be embedded or encoded in a computer-readable medium, and may cause a programmable processor, or other processor, of a device (e.g., computing device 80) to perform the method, e.g., when the instructions are executed.

In some examples, transmitter 20 may be connected to receiver 30 via communication channel 25. Receiver 30 may be connected to signal splitter 40. Signal splitter 40 may be connected to each bit error location analyzer of the plurality of bit error location analyzers 50. In some examples, computing device 80 may be connected to a memory accessible by the plurality of bit error location analyzers 50.

As used herein, the term "connected" may refer to any connection enabling communication between the connected devices, components, or the like. In some examples, the term "connected" may refer to a wired connection. In other examples, the term "connected" may refer to a wireless connection. In other examples, the term "connected" may refer to a wired connection, a wireless connection, or any medium over which communication may occur. In yet other examples, the term "connected" may refer to any form of communicative coupling (e.g., wired, wireless, or any combination thereof). It is also understood that the term "connected" may refer to direct or indirect connections. For example, referring to FIG. 1, receiver 30 may be considered directly connected to signal splitter 40, but may be considered to be indirectly connected to each bit error location analyzer of the plurality of bit error location analyzers 50. It is also understood that FIG. 1 is a simplified example of a communication system 10 as well as a simplified example of each of the components depicted in FIG. 1.

Referring to transmitter 20, transmitter 20 may be configured to modulate an information signal (e.g., a binary signal) with a carrier signal and transmit the carrier signal carrying the information signal over communication channel 25 at a first data rate (which may also be expressed as the first data rate of carrier signal carrying the information signal, or the carrier signal carrying the information signal having the first data rate). It is understood that any data rate described herein may be expressed as the data rate at which a component transmits, outputs, or receives a signal; the data rate of the signal, or the signal having the data rate. As used herein, the term "data rate" may refer to "baud rate" or "modulation rate." Data rate and baud rate may be expressed in terms of bits per second, and modulation rate may be expressed in terms of bits per second or pulses per second. The first data rate of the carrier signal carrying the information signal may, in some examples, be 25 Gigabits per second, 50 Gigabits per second, 100 Gigabits per second, 200 Gigabits per second, or any number of bits per second. In some examples, transmitter 20 may be configured to modulate an information signal with the carrier signal and transmit the carrier signal carrying the information signal over communication channel 25 as part of a test over a period of time. The period of time may be an amount in minutes, hours, days, weeks, or months.

In some examples, communication channel 25 may be a wired communication channel. It is understood that the carrier signal and the information signal are each an actual signal rather than each being a simulated signal. The information signal may be derived or otherwise generated from an information seed. For example, the information signal may not be forward error correction encoded before being modulated with a carrier signal. In some examples, the information seed may be a binary sequence of bits. The binary sequence of bits may include one or more Pseudo-Random Bit Sequence-N (PRBS-M) patterns, where M is any positive integer. For example, the binary sequence of bits may include one or more PRBS-7 patterns, one or more PRBS-31 patterns, or one or more PRBS-M patterns. In examples where the binary sequence of bits includes a plurality of PRBS-M (e.g., PRBS-7 or PRBS-31) patterns, the pattern may be the same expect repeated one or more times relative to the first pattern. For example, the binary sequence of bits may include a plurality of repeating PRBS-7 patterns. As another example, the binary sequence of bits may include a plurality of repeating PRBS-31 patterns.

In some examples, the carrier signal may be a Pulse-Amplitude Modulation-N (PAM-N) signal where N is any positive integer. The value of N in PAM-N denotes the number of possible pulse amplitudes in the carrier signal. For example, a PAM-4 carrier signal includes four possible pulse amplitudes, a PAM-8 carrier signal includes eight possible pulse amplitudes, and a PAM-N carrier signal includes N possible pulse amplitudes. In other examples, the carrier signal may be any modulation signal. As one example, a PAM-4 signal may include four different values (e.g., 0, 1, 2, and 3). While the four levels are expressed with values 0, 1, 2, and 3; it is understood that these are just representative values for the four levels and that in implementation, each level is expressed by a pulse with a different amplitude (e.g., voltage). Each value of a PAM-4 signal corresponds to a symbol representing two bits. For example, the value (or symbol) of 0 may represent the binary sequence of 00, the value (or symbol) of 1 may represent the binary sequence of 01, the value (or symbol) of 2 may represent the binary sequence of 10, and the value (or symbol) of 3 may represent the binary sequence of 11. For example, a PAM-4 signal of 02231 carries the information signal of 0010101110. In this regard, the information represented by the information signal is 0010101110.

Figure 2A:
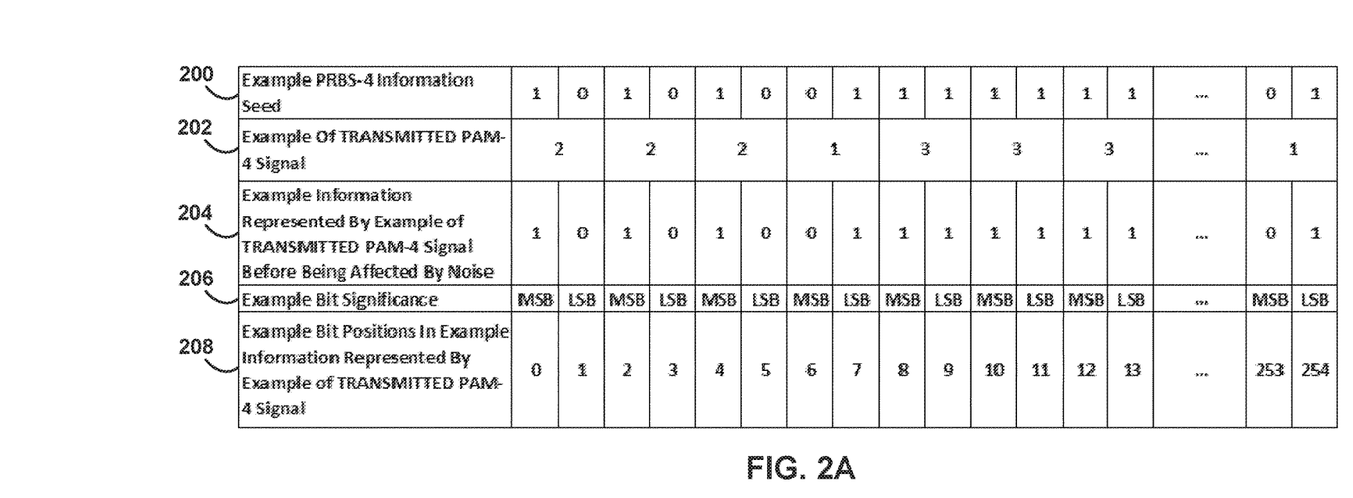
FIG. 2A illustrates transmission of an example information seed using a PAM-4 carrier signal.

FIG. 2A illustrates transmission of an example information seed using a PAM-4 carrier signal. For example, FIG. 2A illustrates an example PRBS-M information seed 200. While the example of information seed 200 is shown as being 254 bits in length, it is understood that information seed 200 may include any number of bits (e.g., hundreds, thousands, millions, or more bits). In some examples, the information seed may be described as repeating pattern. In the example information seed 200 shown in FIG. 2A, the information seed may comprise a two PRBS-7 patterns of 127 bits each with the second PRBS-7 pattern being identical to the first. Transmitter 20 may be configured to transmit example PAM-4 signal 202. As shown, example PAM-4 signal 202 is modulated to carry a binary signal representative of the information seed, as shown by the example information 204 represented by example PAM-4 signal 202 before being affected by noise. Also shown in FIG. 2A is an example bit significance 206 and example bit positions 208. Example bit significance 206 shows that each 2-bit symbol of example PAM-4 signal 202 includes an LSB and an MSB. Example bit positions 208 in FIG. 2A show bit position numbering relative to example information seed 200 and also example information 204 represented by example PAM-4 signal 202 before being affected by noise.

Referring back to FIG. 1, receiver 30 may be configured to receive the carrier signal carrying the information signal from communication channel 25 over which the carrier signal carrying the information signal was transmitted. Receiver 30 may be configured to demodulate the carrier signal carrying the information signal to extract the information signal, and output the information signal extracted from the carrier signal at the first data rate to signal splitter 40. In some examples, the information signal extracted from the carrier signal is a non-return-to-zero (NRZ) binary signal. In other examples, the information signal extracted from the carrier signal is a return-to-zero (RZ) binary signal.

Figure 2B:
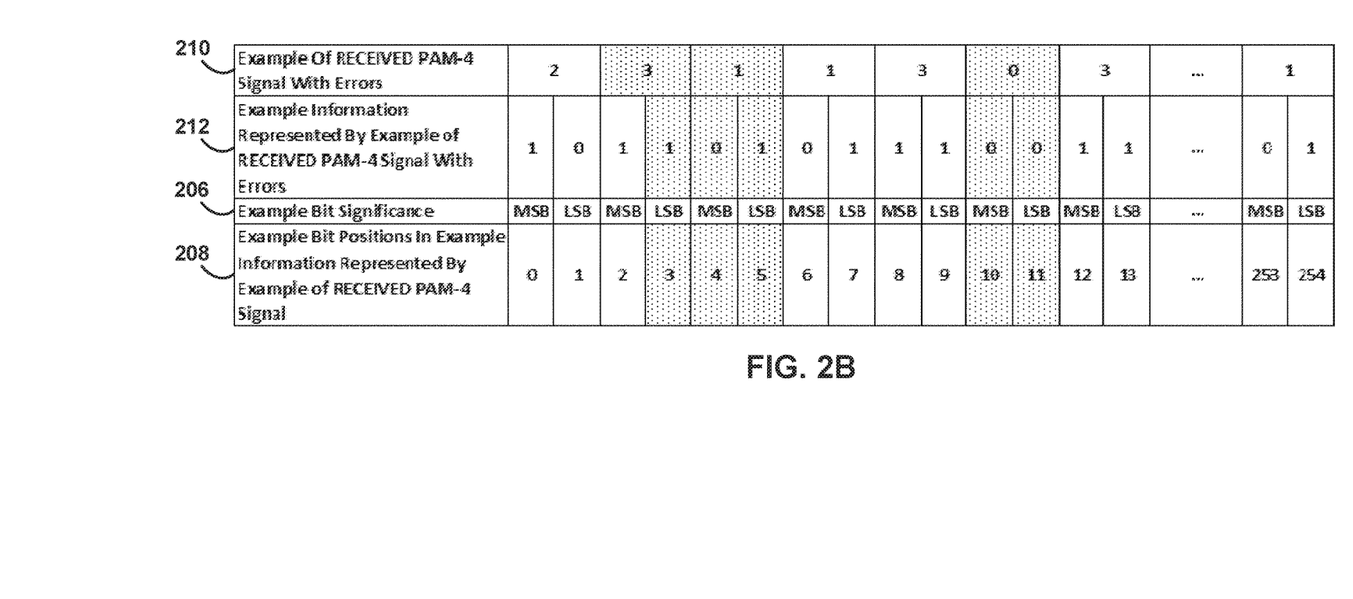
FIG. 2B illustrates reception of an example PAM-4 carrier signal transmission.

FIG. 2B illustrates reception of an example PAM-4 carrier signal transmission. For example, FIG. 2B illustrates that receiver 30 may be configured to receive a corrupted example PAM-4 signal 202, which is shown as example PAM-4 signal 210 with errors. The errors in the received example PAM-4 signal 210 relative to the transmitted example PAM-4 signal 202 are shown with light shading. The errors in example PAM-4 signal 210 result in the carried binary signal also being corrupted. As shown, the errors in the example information 212 represented by example PAM-4 signal 210 relative to example information seed 200 are shown with light shading. While errors are being discussed here, it is understood that error analysis has yet to be performed. Rather, the discussion of error here is to show that the received signal is different from the transmitted signal. Also shown in FIG. 2B is example bit significance 206 and the example bit positions 208. The shading on example bit positions 3, 4, 5, 10, and 11 show that the bit positions 3, 4, 5, 10, and 11 correspond to bit error locations. Again, however, it is understood that error analysis has yet to be performed. Rather, the discussion of errors here is to show that the received signal is different from the transmitted signal. Example bit significance 206 in FIG. 2B shows that each 2-bit symbol of example PAM-4 signal 210 includes an LSB and an MSB. Example bit positions 208 in FIG. 2B show bit position numbering relative to example information seed 200 shown in FIG. 2A and example PAM-4 signal 210 with errors.

In other examples, the bit position numbering may correspond to MSB position 0, LSB position 0, MSB position 1, LSB position 1, MSB position 2, LSB position 2, etc. For example, instead example bit positions 208 being numbered 0 through 254, another example includes bit positions 208 being MSB position 0, LSB position 0, MSB position 1, LSB position 1, MSB position 2, LSB position 2, . . . MSB position 127, LSB position 127. In this nomenclature, the bits corresponding to bit positions 0, 1, 2, 3, 4, 5, 6, 253, and 254 respectively correspond to MSB position 0, LSB position 0, MSB position 1, LSB position 1, MSB position 2, LSB position 2, MSB position 127, and LSB position 127. The bit numbering scheme for the most significant bits may correspond to, in some examples, the MSB 0 numbering scheme or the LSB 0 numbering scheme. Similarly, the bit numbering scheme for the least significant bits may correspond to, in some examples, the MSB 0 numbering scheme or the LSB 0 numbering scheme.

Referring back to FIG. 1, signal splitter 40 may be configured to receive the information signal extracted from the carrier signal at the first data rate. Signal splitter 40 may be configured to split the information signal extracted from the carrier signal at the first data rate into a plurality of information signals derived from the information signal extracted from the carrier signal. The plurality of information signals may also be referred to as a plurality of split information signals to help distinguish the plurality of information signals from the information signal from which the plurality of information signals are derived or otherwise generated.

The plurality of information signals includes at least a first information signal (which may also be referred to as a first split information signal) and a second information signal (which may also be referred to as a second split information signal). For example, where the carrier signal is a PAM-4 signal, the first split information signal may include the LSB bit of each PAM-4 symbol, and the second split information signal may include the MSB bit of each PAM-4 symbol. As another example, where the carrier signal is a PAM-4 signal, the first split information signal may include the MSB bit of each PAM-4 symbol, and the second split information signal may include the LSB bit of each PAM-4 symbol. In other examples, the first split information signal may be described as including every bit corresponding to an even bit position (where the bit position of zero constitutes an even bit position) in the information represented by the information signal carried by the PAM-4 signal, and the second split information signal may be described as including every bit corresponding to an odd bit position in the information represented by the information signal carried by the PAM-4 signal. In other examples, the second split information signal may be described as including every bit corresponding to an even bit position (where the bit position of zero constitutes an even bit position) in the information represented by the information signal carried by the PAM-4 signal, and the first split information signal may be described as including every bit corresponding to an odd bit position in the information represented by the information signal carried by the PAM-4 signal.

Figure 2C:
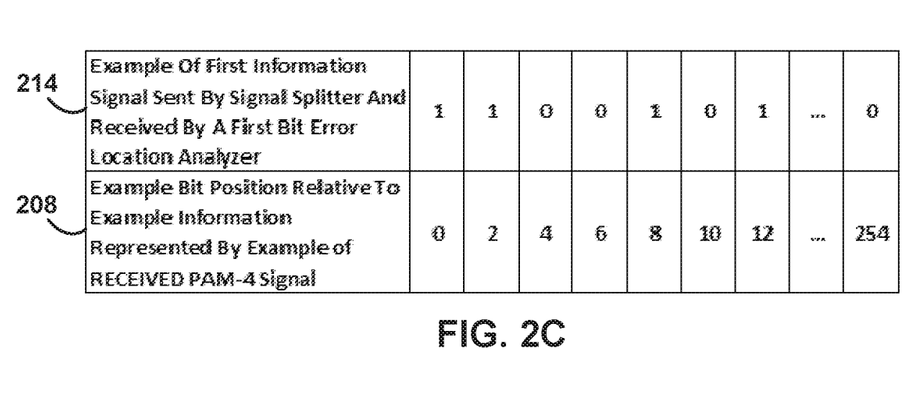
FIG. 2C illustrates an example of a first split information signal.
Figure 2D:
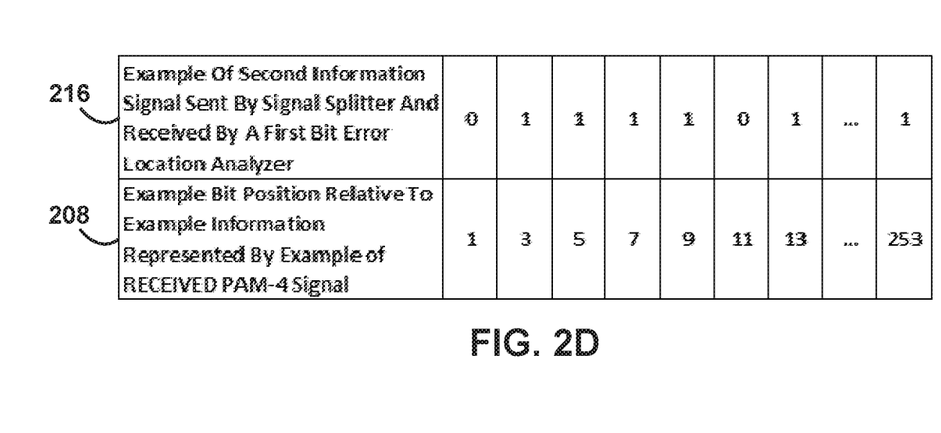
FIG. 2D illustrates an example of a second split information signal.

FIG. 2C illustrates an example of a first split information signal 214 relative to the example information 212 represented by example PAM-4 signal 210. Similarly, FIG. 2D illustrates an example of a second split information signal 216 relative to the example information 212 represented by example PAM-4 signal 210. A first bit error location analyzer (e.g., bit error location analyzer 50A) may be configured to receive the first split information signal 214 and perform error analysis thereon in accordance with the techniques described herein, and a second bit error location analyzer (e.g., bit error location analyzer 50B) may be configured to receive the second split information signal 216 and perform error analysis thereon in accordance with the techniques described herein.

In other examples, the plurality of information split signals may include more than two split information signals (e.g., other examples may include one or more split information signals in addition to the first split information signal and the second split information signal). For example, the plurality of information split signals may include a first, a second, a third, and a fourth information split signal. For example, where the carrier signal is a PAM-4 signal, the first split information signal may include every other LSB bit of each PAM-4 symbol. The second split information signal may include the remaining LSB bits of each PAM-4 symbol (i.e., every other LSB bit relative to the LSB bits that make up the first split information signal. The third split information signal may include every other MSB bit of each PAM-4 symbol. The fourth split information signal may include the remaining MSB bits of each PAM-4 symbol (i.e., every other MSB bit relative to the MSB bits that make up the third split information signal. For example, a PAM-4 signal of 13302210 carries the information signal of 0111110010100100. In this regard, the information represented by the information signal is 0111110010100100. The first split information signal may include the underlined bits in 01<u>1</u>1<u>1</u>100<u>1</u>0<u>1</u>00<u>1</u>00, such that the first split information signal is 1000. The second split information may include the underlined bits in 0<u>1</u>11<u>1</u>1<u>0</u>010<u>1</u>00<u>1</u>00, such that the first split information signal is 1101. The third split information may include the underlined bits in 01<u>1</u>1<u>1</u>1<u>0</u>0<u>1</u>0100<u>1</u>00, such that the first split information signal is 1010. The fourth split information signal may include the underlined bits in <u>0</u>111 1<u>1</u>00<u>1</u>0100<u>0</u>100, such that the first split information signal is 0110.

In an example where the carrier signal is a PAM-16 signal, and the plurality of information split signals includes four split information signals, the first split information signal may include the LSB bit of each PAM-16 symbol. The second split information signal may include the second LSB of each PAM-16 symbol. The third split information signal may include the third LSB of each PAM-16 symbol. The fourth split information signal may include the MSB bit of each PAM-16 symbol. For example, a PAM-16 signal of 597 carries the information signal of 010110010111. In this regard, the information represented by the information signal is 010110010111. The first split information signal may include the underlined bits in 010<u>1</u>100<u>1</u>0<u>1</u>1<u>1</u>, such that the first split information signal is 111. The second split infor-mation signal may include the underlined bits in 01<u>0</u>110 010<u>1</u>1<u>1</u>, such that the first split information signal is 001. The third split information signal may include the underlined bits in 0<u>1</u>0110<u>0</u>10<u>1</u>11, such that the first split information signal is 101. The fourth split information signal may include the underlined bits in <u>0</u>10110010111, such that the first split information signal is 010.

Each split information signal of the plurality of split information signals may have a respective data rate that is less than the first data rate. In some examples, the respective data rate for each split information signal of the plurality of split information signals may be equal to the first data rate divided by a number, where the number may be equal to a power of 2 or how many split information signals comprise the plurality of split information signals. For example, if the number equal to a power of 2 is 2, the respective data rate for each of the two information signals is equal to the first data rate divided by 2. As another example, if the number equal to a power of 2 is 4, the respective data rate for each of the two information signals is equal to the first data rate divided by 4. As another example, if the plurality of split information signals includes two split information signals, the respective data rate for each of the two split information signals may be equal to the first data rate divided by 2.

As an example, if the first data rate is 50 Gigabits per second, then the respective data rate for each of the two split information signals may be equal to 25 Gigabits per second. As another example, if the plurality of split information signals includes three split information signals, the respective data rate for each of the three split information signals may be equal to the first data rate divided by 3. In such an example, if the first data rate is 150 Gigabits per second, then the respective data rate for each of the three split information signals may be equal to 50 Gigabits per second. As another example, if the plurality of split information signals includes four split information signals, the respective data rate for each of the four split information signals may be equal to the first data rate divided by 4. In such an example, if the first data rate is 100 Gigabits per second, then the respective data rate for each of the four split information signals may be equal to 25 Gigabits per second. As another example, if the plurality of split information signals includes X split information signals where X is any positive integer greater than or equal to 2, the respective data rate for each of the X split information signals may be equal to the first data rate divided by X. In such an example, if the first data rate is Y bits per second where Y is any data rate, then the respective data rate for each of the X split information signals may be equal to Y/X bits per second.

In other examples, the respective data rate for each split information signal of the plurality of split information signals may not each be equal. For example, if the plurality of split information signals includes two split information signals, the data rate for the first split information signal may be equal to A bits per second and the data rate for the second split information signal may be equal to B bits per second, where A+B equals the first data rate but A and B are not equal. In such an example, if the first data rate is 40 Gigabits per second, then A may equal 25 Gigabits per second and B may equal 15 Gigabits per second.

In examples where the information seed includes one or more PRBS-M patterns, signal splitter 40 may be configured to split the information signal extracted from the carrier signal at the first data rate into the plurality of split information signals based on the Galois theorem that dividing a PRBS-M pattern by Z (where Z is a power of 2) results in the same PRBS-M pattern at a slower data rate and a different phase relative to the extracted information signal. In such examples, signal splitter 40 may be configured to split the information signal extracted from the carrier signal at the first data rate into the plurality of split information signals by dividing information represented by the extracted information signal by a power of 2 (e.g., 2, 4, 8, 16, or any other power of 2). In an example where signal splitter 40 is configured to split the information signal extracted from the carrier signal into two split information signals, the information represented by the first split information signal every bit corresponding to an even bit position (where the bit position of zero constitutes an even bit position) in the information represented by the information signal carried by the carrier signal, and the second split information signal may include every bit corresponding to an odd bit position in the information represented by the information signal carried by the carrier signal. In other examples, the second split information signal may include every bit corresponding to an even bit position (where the bit position of zero constitutes an even bit position) in the information represented by the information signal carried by the carrier signal, and the first split information signal may be described as including every bit corresponding to an odd bit position in the information represented by the information signal carried by the carrier signal.

In examples where the carrier signal is a PAM-N signal, the number of most significant bits and the number of least significant bits may each be equal to $((2^M)/2)$ for each PRBS-M pattern. A PRBS-M pattern may include $(2^M)$ minus 1 bits, which may result in an odd number of bits. In some examples where the PRBS-M pattern includes an odd number of bits, the number of most significant bits may be equal to $((2^M)/2)$ and the number of least significant bits may be equal to $((2^M)/2)-1$, or the number of most significant bits may be equal to $((2^M)/2)-1$ and the number of least significant bits may be equal to $((2^M)/2)$. In some examples where $(2^M)$ minus 1 amounts to an odd number of bits, the number of bits in the information seed may be an even number by padding one bit onto the information seed.

Signal splitter 40 may be configured to output each split information signal of the plurality of split information signals at a respective data rate less than the first data rate to a respective bit error location analyzer of the plurality of bit error location analyzers 50. In some examples, signal splitter 40 is configured to output the first split information signal at a second data rate less than the first data rate, and signal splitter 40 is configured to output the second split information signal at a third data rate less than the first data rate. The second data rate and the third data rate may be the same or different.

The plurality of bit error location analyzers 50 may be configured to receive the plurality of split information signals output by signal splitter 40 such that a different respective bit error location analyzer of the plurality of bit error location analyzers 50 receives each split information signal of the plurality of split information signals. For example, bit error location analyzer 50A may be configured to receive the first split information signal at the second data, and bit error location analyzer 50B may be configured to receive the second split information signal at the third data rate. In some examples, each bit error location analyzer of the plurality of bit error location analyzers 50 may be incapable of processing the information signal extracted from the carrier signal at the first data rate.

Each bit error location analyzer of the plurality of bit error location analyzers 50 may be configured to perform error analysis on information represented by a received split information signal. In some examples, each bit error location analyzer may be configured to perform error analysis by being configured to compare information represented by a received signal to an information seed to determine bit error locations in the information represented by the received split information signal relative to the information seed. The information represented by the received signal may be stored in a buffer in volatile memory space. For example, relative to the examples shown in FIGS. 2C and 2D, the first bit error location analyzer (e.g., bit error location analyzer 50A) may be configured to receive the first split information signal 214 and store the received information signal 214 in a buffer in volatile memory space (e.g., a buffer, such as a circular buffer), and the second bit error location analyzer (e.g., bit error location analyzer 50B) may be configured to receive the second split information signal 216 and store the received information signal 216 in a buffer in volatile memory space (e.g., a buffer, such as a circular buffer).

The information represented by the received signal may be compared to the information seed on-the-fly, meaning that the information represented by the received signal may be compared to the information seed as the information corresponding to the received signal is stored in volatile memory space (e.g., in a buffer in volatile memory space). Otherwise described, each respective bit error location analyzer of the plurality of bit error location analyzers 50 may be configured to compare the received signal stored in temporary memory space to the information seed. Any mismatch relative to the information seed is a bit error, and the bit error location corresponding to each bit error is stored in a memory (e.g., non-volatile memory), such as in a file in memory where the file includes a data structure for storing bit error locations. For example, relative to the examples shown in FIGS. 2C and 2D, the first bit error location analyzer (e.g., bit error location analyzer 50A) may be configured to compare the information represented by information signal 214 to information seed 200, and determine that the bits corresponding to bit positions 4 and 10 do not match the values in information seed 200. The first bit error location analyzer may be configured to store bit error locations 4 and 10 in the memory (e.g., a non-volatile memory), which may be subsequently retrieved by another device and/or process. Similarly, the second bit error location analyzer (e.g., bit error location analyzer 50B) may be configured to compare the information represented by information signal 216 to information seed 200, and determine that the bits corresponding to bit positions 3, 5, and 11 do not match the values in information seed 200. The second bit error location analyzer may be configured to store bit error locations 3, 5, and 11 in the memory (e.g., a non-volatile memory), which may be subsequently retrieved by another device and/or process.

In some examples, the file may be a Comma Separated Values (CSV) file. In other examples, the file may have any format in which tabular data may be formatted and/or stored. Each bit error location analyzer of the plurality of bit error location analyzers 50 is configured to use the same bit numbering scheme for storing bit error locations. For example, each bit error location analyzer may be configured to store bit error locations according to the MSB 0 numbering scheme, or each bit error location analyzer may be configured to store bit error locations according to the LSB 0 numbering scheme. Each bit error location analyzer may store bit error locations in its own separate file. For example, bit error location analyzer 50A may be configured to store bit error locations in a first file and bit error location analyzer 50B may be configured to store bit error locations in a second file, where the first and second files are different files that may be stored on the same or different memory.

In some examples, each bit error location analyzer of the plurality of bit error location analyzers 50 may be configured with a buffer in volatile memory to store the information represented by the received signal as the received signal is received. The buffer may be a circular buffer. Each bit error location analyzer of the plurality of bit error location analyzers 50 may also be configured with its own non-volatile memory in which to store error locations, such as in a file. For example, bit error location analyzer 50A may have its own volatile memory in which to store any bit error locations, and bit error location analyzer 50B may have its own volatile memory in which to store any bit error locations. In such examples, bit error location combiner 60 may be configured to access any files stored in the non-volatile memory space of each bit error location analyzer of the plurality of bit error location analyzers 50.

In other examples, each bit error location analyzer of the plurality of bit error location analyzers 50 may be configured to store bit error locations, such as in a file, in a memory accessible by each respective bit error location analyzer may be a memory accessible by each bit error location analyzer, which may be referred to as a common memory or system memory that is accessible by the plurality of error locations analyzers 50. In such examples, bit error location combiner 60 may be configured to access any files stored in the common memory. In some examples, the common memory may reside on computing device 80. In other examples, the common memory may reside on the same device (e.g., computing device 80) that is configured to execute the software corresponding to bit error location combiner 60. In other examples, the common memory may reside on the same device (e.g., computing device 80, a server, or another device) that is configured to execute the software corresponding to post-processing module 70. In yet other examples, the common memory may reside on a server that is different from computing device 80 and any device on which the software corresponding to post-processing module is configured to be executed. Such a server may be accessible by each bit error location analyzer of the plurality of bit error location analyzers 50, and may also be accessible by the device (e.g., computing device 80) configured to execute the software corresponding to bit error location combiner 60.

Bit error location analyzer 50A may be configured perform error analysis on information represented by the first split information signal. For example, bit error location analyzer 50A may be configured to perform error analysis by being configured to compare information represented by the first split information signal to an information seed to determine bit error locations in the information represented by the first split information signal relative to the information seed. Bit error location analyzer 50B may be configured perform error analysis on information represented by the second split information signal. For example, bit error location analyzer 50B may be configured to perform error analysis by being configured to compare information represented by the second split information signal to an information seed to determine bit error locations in the information represented by the second split information signal relative to the information seed.

Each respective bit error location analyzer of the plurality of bit error location analyzers 50 may be configured to store each determined bit error location in a memory accessible by each respective error location. In some examples, the memory accessible by each respective bit error location analyzer may be a memory accessible by each bit error location analyzer (e.g., a common memory that is accessible by the plurality of error locations analyzers 50). In other examples, the memory accessible by each respective bit error location analyzer may be a different memory accessible by each bit error location analyzer (e.g., each bit error location analyzer may have its own memory.

As one simplified example, information represented by a received split information signal may expressed as 00110 and the information seed may be 10100. In this example, an bit error location analyzer (e.g., bit error location analyzer 50A or bit error location analyzer 50B) may be configured to compare 00110 to 10100 to determine bit error locations in 00110 relative to 10100. In this example, the bit error location analyzer may determine that, according to the LSB 0 numbering scheme, that bit position 1 constitutes a first bit error location and that bit position 4 constitutes a second bit error location. The bit error location analyzer may store each determined bit error location in a memory accessible to the bit error location analyzer (e.g., a memory of the bit error location analyzer not accessible by other bit error location analyzers, or a memory external to the bit error location analyzer that may be accessible by any bit error location analyzer). For example, the bit error location analyzer may store the values 1 and 4 in a data structure corresponding to a file in memory. As one example, the data structure may include a matrix. The values 1 and 4 stored in memory correspond to and represent bit error location 1 and bit error location 4.

Bit error location combiner 60 may be configured to combine the bit error locations stored in multiple data structures corresponding to different files. In some examples, each file may be generated by a different bit error location analyzer. For example, bit error location combiner 60 may be configured to combine the bit error locations in the information represented by the first split information signal stored in the memory accessible by the first bit error location analyzer (e.g., bit error location analyzer 50A) and the bit error locations in the information represented by the second information signal stored in the memory accessible by the second bit error location analyzer into a single error location file for subsequent analysis. Otherwise described, bit error location combiner 60 may be configured to combine a first plurality of bit error locations stored in a first data structure generated by the first bit error location analyzer (e.g., bit error location analyzer 50A) and a second plurality of bit error locations stored in a second data structure generated by the second bit error location analyzer (e.g., bit error location analyzer 50B). The first data structure may correspond to a first file and the second data structure may correspond to a second file.

In some examples, bit error location combiner 60 may be configured to combine the bit error locations stored in multiple data structures corresponding to different files by being configure to calculate an offset and apply the offset to the bit error locations stored in one of the data structures to, for example, deskew bit error locations. In such examples, bit error location combiner 60 may be configured to combine a first plurality of bit error and the second plurality of bits, where either the first plurality of bit error locations or the second plurality of bit error locations are modified by an offset value.

As one example involving the first split information signal and the second split information signal, bit error location combiner 60 may be configured to reconstruct the information represented by the first split information signal by using the information seed and the first plurality of bit error locations and bit error location combiner 60 may be configured to reconstruct the information represented by the second split information signal by using the information seed and the second plurality of bit error locations. In this example, bit error location combiner 60 may be configured to reconstruct the information represented by the first split information signal by inverting bit values in the information seed corresponding to the first plurality of bit error locations resulting in first reconstructed information, and bit error location combiner 60 may be configured to reconstruct the information represented by the second split information signal by inverting bit values in the information seed corresponding to the second plurality of bit error locations resulting in second reconstructed information.

In some examples, bit error location combiner 60 may be configured to find a binary pattern having a beginning bit position and an end bit position in the first reconstructed information (or the second reconstructed information in other examples), and find the same binary pattern having a beginning bit position and an end bit position in the second reconstructed information (or the first reconstructed information in other examples).

Bit error location combiner 60 may be configured to calculate the offset, if any exists, between the first constructed information and the second reconstructed information by subtracting the beginning bit position (or the end bit position in other examples) of the binary pattern in the first reconstructed information from the beginning bit position (or the end bit position in other examples) of the binary pattern in the second reconstructed information, or vice versa depending on the bit numbering scheme used. If LSB 0 numbering is used, then the beginning bit position (or the end bit position in other examples) of the binary pattern in the second reconstructed information is subtracted from the beginning bit position (or the end bit position in other examples) of the binary pattern in the first reconstructed information. If MSB 0 numbering is used, then the beginning bit position (or the end bit position in other examples) of the binary pattern in the first reconstructed information is subtracted from the beginning bit position (or the end bit position in other examples) of the binary pattern in the second reconstructed information.

As described with reference to a simplified example where the binary pattern is 0010, the first reconstructed information is 11111001000000001111 and the second reconstructed information is 00000111111001000000, the offset here would be calculated based on the beginning position in a LSB 0 numbering scheme as follows: 13-8, which equals 5. In this example, bit error location combiner 60 may be configured to apply the offset to each bit error location of the second plurality of bit error locations. In some examples, applying the offset to a bit error location may include adding the offset to the bit error location. For example, if the second plurality of bit errors locations include 3, 5, 9, and 10; then the second plurality of bit errors after being offset would include 8, 10, 14, and 15. By applying the offset to the bit error locations, bit error location combiner 60 is able to compensate for any differences caused by skew (e.g., cable skew). In examples where the information seed includes PRBS-M patterns, bit error location combiner 60 may be able to compensate for any differences caused by skew if the calculated offset is equal to a value within the range of $-((2^{\wedge}M)/2)$ to $((2^{\wedge}M)/2)$, inclusive of $-((2^{\wedge}M)/2)$ and $((2^{\wedge}M)/2)$.

Post-processing module 70 may be configured to analyze the single error location file for determining at least one of: a forward error correction block size, a respective T value for each block, or a forward error correction symbol size. In some examples, each determination may be a constraint in a Reed-Solomon forward error correction encoding scheme. In some examples, post-processing module 70 may be configured to output any determination to a display of computing device 80 for presentment.

In some examples, post-processing module 70 may be software executable by one or more processors of computing device 80. In other examples, post-processing module 70 may be software executable by one or more processors of a device different from computing device 80, such as a server (e.g., a Linux server). For example, bit error location combiner 60 may be software executable by one or more processors of computing device 80, and post-processing module 70 may be software executable by a server connected to computing device 80. The server may be a network device of communication system 10. Post-processing module 70, when software, may be embodied or encoded in a computer-readable medium, such as a computer-readable storage medium, containing instructions. The instructions corresponding to post-processing module 70 may be embedded or encoded in a computer-readable medium, and may cause a programmable processor, or other processor, of a device (e.g., a server or computing device 80) to perform the method, e.g., when the instructions are executed.

Figure 3:
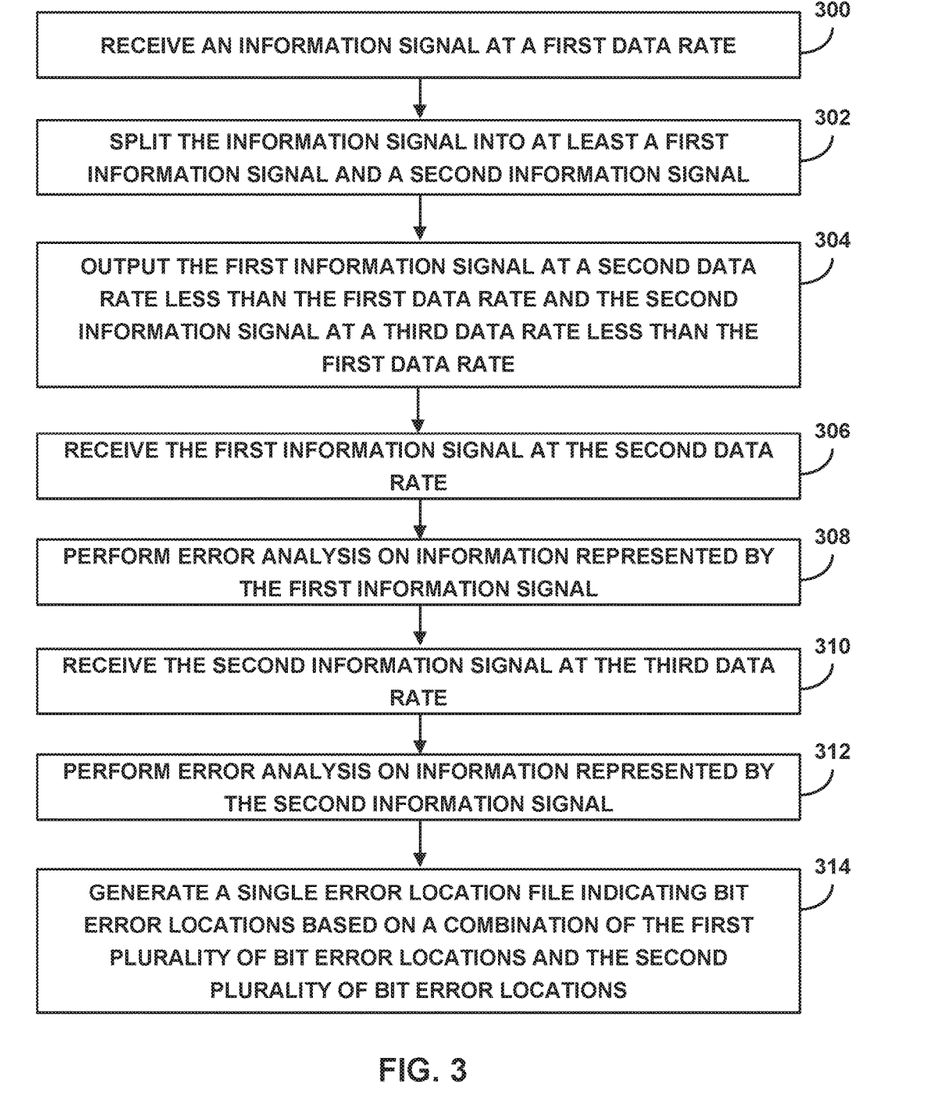
FIG. 3 is a flowchart illustrating an example process for capturing non-simulated errors in accordance with one or more techniques of this disclosure.

FIG. 3 is a flowchart illustrating an example process for capturing non-simulated errors in accordance with one or more techniques of this disclosure. The process of FIG. 3 is generally described as being performed by the components shown in FIG. 1. In the example of FIG. 3, signal splitter 40 may be configured to receive an information signal at a first data rate (300). In some examples, the information signal may be extracted from a carrier signal carrying the information. The carrier signal may be a Pulse-Amplitude Modulation-N (PAM-N) signal, where N is any positive integer.

Signal splitter 40 may be configured to split the information signal into at least a first information signal and a second information signal (302). Signal splitter 40 may be configured to output the first information signal at a second data rate less than the first data rate and the second information signal at a third data rate less than the first data rate (304).

A first bit error location analyzer (e.g., bit error location analyzer 50A) may be configured to receive the first information signal at the second data rate (306). The first bit error location analyzer may be configured to perform error analysis on information represented by the first information signal (308). In some examples, the first bit error location analyzer may be configured to perform error analysis by being configured to compare the information represented by the first information signal to an information seed to determine a first plurality of bit error locations in the information represented by the first information signal relative to the information seed. In some examples, the information seed is a binary sequence of bits that includes one or more Pseudo-Random Bit Sequence-M (PRBS-M) patterns, where M is any positive integer. A PRBS-M pattern may include a number of bits equal to $(2^{\wedge}M)-1$. For example, a PRBS-7 pattern may include 127 bits, and two sequential PRBS-7 patterns may equal, in total, 254 bits. In some examples, the first bit error location analyzer may be incapable of performing error analysis at the first data rate.

A second bit error location analyzer (e.g., bit error location analyzer 50B) may be configured to receive the second information signal at the third data rate (310). In some examples, the second data rate and the third data rate may be the same. In some examples, the second data rate and the third data rate are equal to the first data rate divided by a number, wherein the number is equal to a power of 2. For example, if the number is 2, the second data rate and the third data rate may each be equal to the first data rate divided by 2. As another example, if the number is 4, the second data rate and the third data rate may each be equal to the first data rate divided by 4. As another example, if the number is N, the second data rate and the third data rate may each be equal to the first data rate divided by N.

The second bit error location analyzer may be configured to perform error analysis on information represented by the second information signal (312). In some examples, the second bit error location analyzer may be configured to perform error analysis by being configured to compare the information represented by the second information signal to the information seed to determine a second plurality of bit error locations in the information represented by the second information signal relative to the information seed. In some examples, the second bit error location analyzer is incapable of performing error analysis at the first data rate.

Bit error location combiner 60 may be configured to generate a single error location file indicating bit error locations based on a combination of the first plurality of bit error locations and the second plurality of bit error locations (314). In some examples, a post-processing module may be configured to perform analysis on the single error location file for determining at least one of: a forward error correction block size, a respective T value for each block, or a forward error correction symbol size.

Receiver 30 may be configured to receive a carrier signal, which carries the information signal, from communication channel 25, and demodulate the carrier signal to extract the information signal from the carrier signal. Receiver 30 may be configured to output the information signal extracted from the carrier signal at the first data rate to signal splitter 40. In some examples, the information signal extracted from the carrier signal is a non-return-to-zero (NRZ) binary signal. The carrier signal may be a Pulse-Amplitude Modulation-N (PAM-N) signal, where N is any positive integer.

Transmitter 20 may be configured to modulate the information signal derived from the information seed with the carrier signal, and transmit the carrier signal carrying the information signal over the communication channel.

In some examples, the first bit error location analyzer may be configured to store the first plurality of bit error locations in a first data structure in a memory accessible by the first bit error location analyzer, and the second bit error location analyzer may be configured to store the second plurality of bit error locations in a second data structure in a memory accessible by the second bit error location analyzer. Bit error location combiner 60 may be configured to generate the single error location file indicating bit error locations based on the combination of the first plurality of bit error locations and the second plurality of bit error locations by being configured to generate the single error location file indicating bit error locations based on the combination of the first plurality of bit error locations stored in the first data structure and the second plurality of bit error locations stored in the second data structure. In some examples, the memory accessible by the first bit error location analyzer and the memory accessible by the second error location are the same.

In some examples, signal splitter 40 may be configured to split the information signal by being configured to split the information signal into at least the first information signal, the second information signal, a third information signal, and a fourth information signal, and wherein the signal splitter is configured to output the third information signal at a fourth data rate less than the first data rate and output the fourth information signal at a fifth data rate less than the first data rate. In such examples, the second data rate, the third data rate, the fourth data rate, and the fifth data rate may be the same.

The various examples described herein may be combined in any combination. Similarly, any example described herein including two or more features (e.g., steps, components, or the like) is also understood as including one or more less features in other examples.

As used herein, any reference to a transmitter not followed by the number 20 may, in some examples, be understood to refer to transmitter 20. Any reference to a communication channel not followed by the number 25 may, in some examples, be understood to refer to communication channel 25. Any reference to a receiver not followed by the number 30 may, in some examples, be understood to refer to receiver 30. Any reference to a signal splitter not followed by the number 40 may, in some examples, be understood to refer to signal splitter 40. Any reference to a bit error location analyzer not followed by the number 50 (or a further identifying number such as 50A or 50B) may, in some examples, be understood to refer to a bit error location analyzer of the plurality of bit error location analyzers 50. Any reference to a bit error location combiner 60 not followed by the number 60 may, in some examples, be understood to refer to bit error location combiner 60. Any reference to a post-processing module 70 not followed by the number 70 may, in some examples, be understood to refer to post-processing module 70.

As used herein, the acronym "MSB" refers to most significant bit and the acronym "LSB" refers to least significant bit.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

What is claimed is:

1. A method comprising:
    receiving, by a signal splitter, an information signal at a first data rate;
    splitting, by the signal splitter, the information signal into at least a first information signal and a second information signal;
    outputting, by the signal splitter, the first information signal at a second data rate less than the first data rate and the second information signal at a third data rate less than the first data rate;
    receiving, by a first bit error location analyzer, the first information signal at the second data rate, wherein the first bit error location analyzer is incapable of performing error analysis at the first data rate;
    performing a first error analysis, by the first bit error location analyzer, on the first information signal, wherein performing the first error analysis includes comparing the first information signal to an information seed to determine, relative to the information seed, a first plurality of bit error locations in the first information signal;
    receiving, by a second bit error location analyzer, the second information signal at the third data rate, wherein the second bit error location analyzer is incapable error analysis at the first data rate;
    performing a second error analysis, by the second bit error location analyzer, on the second information signal, wherein performing the second error analysis includes comparing the second information signal to the information seed to determine, relative to the information seed, a second plurality of bit error locations in the second information signal; and
    generating, by a bit error location combiner, a single error location file indicating bit error locations based on a combination of the first plurality of bit error locations and the second plurality of bit error locations.

2. The method of claim 1, further comprising performing, by one or more processors, an analysis on the single error location file for determining at least one of:
    a forward error correction block size;
    a respective T value for each block; or
    a forward error correction symbol size.

3. The method of claim 1, further comprising:
    receiving, by a receiver, a carrier signal, which carries the information signal, from a communication channel over which the carrier signal carrying the information signal was transmitted, wherein the carrier signal is a Pulse-Amplitude Modulation-N (PAM-N) signal, where N is any positive integer;
    demodulating, by the receiver, the carrier signal carrying the information signal to extract the information signal, wherein the information signal extracted from the carrier signal is a non-return-to-zero (NRZ) binary signal; and
    outputting, by the receiver, the information signal extracted from the carrier signal at the first data rate to the signal splitter.

4. The method of claim 3, further comprising:
    modulating, by a transmitter, the carrier signal to carry a binary signal representative of the information seed; and
    transmitting, by the transmitter, the carrier signal carrying the binary signal over the communication channel to the receiver.

5. The method of claim 1, wherein the information seed is a binary sequence of bits that includes one or more Pseudo-Random Bit Sequence-M (PRBS-M) patterns, where M is any positive integer.

6. The method of claim 1, further comprising:
    storing, by the first bit error location analyzer, the first plurality of bit error locations in a first data structure in a memory accessible by the first bit error location analyzer; and
    storing, by the second bit error location analyzer, the second plurality of bit error locations in a second data structure in a memory accessible by the second bit error location analyzer, wherein generating the single error location file indicating bit error locations based on the combination of the first plurality of bit error locations and the second plurality of bit error locations comprises generating the single error location file indicating bit error locations based on the combination of the first plurality of bit error locations stored in the first data structure and the second plurality of bit error locations stored in the second data structure.

7. The method of claim 6, wherein the memory accessible by the first bit error location analyzer and the memory accessible by the second error location are the same.

8. The method of claim 1, wherein the information signal is extracted from a carrier signal.

9. The method of claim 8, wherein the carrier signal is a Pulse-Amplitude Modulation-N (PAM-N) signal, where N is any positive integer.

10. The method of claim 1, wherein the second data rate and the third data rate are equal to the first data rate divided by a number, wherein the number is equal to a power of 2 such that:
    if the number is 2, the second data rate and the third data rate are each equal to the first data rate divided by 2;
    if the number is 4, the second data rate and the third data rate are each equal to the first data rate divided by 4; or
    if the number is N, the second data rate and the third data rate are each equal to the first data rate divided by N.

11. The method of claim 1, wherein the second data rate and the third data rate are the same.

12. The method of claim 1, wherein splitting the information signal comprises splitting the information signal into at least the first information signal, the second information signal, a third information signal, and a fourth information signal, the method further comprising:
    outputting the third information signal at a fourth data rate less than the first data rate and outputting the fourth information signal at a fifth data rate less than the first data rate.

13. The method of claim 12, wherein the second data rate, the third data rate, the fourth data rate, and the fifth data rate are the same.

14. A system comprising:
a signal splitter configured to receive an information signal at a first data rate, split the information signal into at least a first information signal and a second information signal, and output the first information signal at a second data rate less than the first data rate and the second information signal at a third data rate less than the first data rate;
a first bit error location analyzer configured to receive the first information signal at the second data rate, and perform a first error analysis on the first information signal, wherein the first bit error location analyzer is configured to perform the first error analysis by comparing the first information signal to an information seed to determine, relative to the information seed, a first plurality of bit error locations in the first information signal, and wherein the first bit error location analyzer is incapable of performing error analysis at the first data rate;
a second bit error location analyzer configured to receive the second information signal at the third data rate, and perform a second error analysis on the second information signal, wherein the second bit error location analyzer is configured to perform the second error analysis by comparing the second information signal to the information seed to determine, relative to the information seed, a second plurality of bit error locations in the second information signal, and wherein the second bit error location analyzer is incapable of performing error analysis at the first data rate; and
a bit error location combiner configured to generate a single error location file indicating bit error locations based on a combination of the first plurality of bit error locations and the second plurality of bit error locations.

15. The system of claim 14, further comprising one or more processors that perform an analysis on the single error location file for determining at least one of:
a forward error correction block size;
a respective T value for each block; or
a forward error correction symbol size.

16. The system of claim 14, further comprising:
a receiver configured to receive a carrier signal, which carries the information signal, from a communication channel, demodulate the carrier signal to extract the information signal from the carrier signal, and output the information signal extracted from the carrier signal at the first data rate to the signal splitter, wherein the information signal extracted from the carrier signal is a non-return-to-zero (NRZ) binary signal, and wherein the carrier signal is a Pulse-Amplitude Modulation-N (PAM-N) signal, where N is any positive integer.

17. The system of claim 16, further comprising:
a transmitter configured to modulate the carrier signal to carry a binary signal representative of the information seed, and transmit the carrier signal carrying the binary signal over the communication channel to the receiver.

18. The system of claim 14, wherein the information seed is a binary sequence of bits that includes one or more Pseudo-Random Bit Sequence-M (PRBS-M) patterns, where M is any positive integer.

19. The system of claim 14, wherein the first bit error location analyzer is configured to store the first plurality of bit error locations in a first data structure in a memory accessible by the first bit error location analyzer, and the second bit error location analyzer is configured to store the second plurality of bit error locations in a second data structure in a memory accessible by the second bit error location analyzer, and wherein the bit error location combiner is configure to generate the single error location file indicating bit error locations based on the combination of the first plurality of bit error locations and the second plurality of bit error locations by being configured to generate the single error location file indicating bit error locations based on the combination of the first plurality of bit error locations stored in the first data structure and the second plurality of bit error locations stored in the second data structure.

20. The system of claim 19, wherein the memory accessible by the first bit error location analyzer and the memory accessible by the second error location are the same.

21. The system of claim 14, wherein the information signal is extracted from a carrier signal.

22. The system of claim 21, wherein the carrier signal is a Pulse-Amplitude Modulation-N (PAM-N) signal, where N is any positive integer.

23. The system of claim 14, wherein the second data rate and the third data rate are equal to the first data rate divided by a number, wherein the number is equal to a power of 2 such that:
if the number is 2, the second data rate and the third data rate are each equal to the first data rate divided by 2;
if the number is 4, the second data rate and the third data rate are each equal to the first data rate divided by 4; or
if the number is N, the second data rate and the third data rate are each equal to the first data rate divided by N.

24. The system of claim 14, wherein the second data rate and the third data rate are the same.

25. The system of claim 14, wherein the signal splitter is configured to split the information signal by being configured to split the information signal into at least the first information signal, the second information signal, a third information signal, and a fourth information signal, and wherein the signal splitter is configured to output the third information signal at a fourth data rate less than the first data rate and output the fourth information signal at a fifth data rate less than the first data rate.

26. The system of claim 25, wherein the second data rate, the third data rate, the fourth data rate, and the fifth data rate are the same.

* * * * *